United States Patent
Tarasuk-Levin et al.

(10) Patent No.: US 10,564,996 B2
(45) Date of Patent: Feb. 18, 2020

(54) PARENTLESS VIRTUAL MACHINE FORKING

(71) Applicant: VMware, Inc., Palo Alto, CA (US)

(72) Inventors: Gabriel Tarasuk-Levin, Sunnyvale, CA (US); Derek Beard, Austin, TX (US); Li Zheng, Palo Alto, CA (US); Brian Forney, Mountain View, CA (US); Brian Rak, Austin, TX (US); Ali Reza Alibhai, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 130 days.

(21) Appl. No.: 15/665,742

(22) Filed: Aug. 1, 2017

(65) Prior Publication Data

US 2018/0060104 A1 Mar. 1, 2018

Related U.S. Application Data

(60) Provisional application No. 62/380,435, filed on Aug. 28, 2016.

(51) Int. Cl.
| | | |
|---|---|---|
| *G06F 9/455* | (2018.01) | |
| *G06F 9/48* | (2006.01) | |
| *G06F 9/50* | (2006.01) | |

(52) U.S. Cl.
CPC ........ *G06F 9/45558* (2013.01); *G06F 9/4856* (2013.01); *G06F 9/5027* (2013.01); *G06F 2009/4557* (2013.01); *G06F 2009/45562* (2013.01); *G06F 2009/45575* (2013.01)

(58) Field of Classification Search
CPC ............ G06F 2212/152; G06F 3/0647; G06F 9/4856; G06F 11/1446; G06F 2201/815; G06F 2009/45575
See application file for complete search history.

(56) References Cited

U.S. PATENT DOCUMENTS

| | | | | |
|---|---|---|---|---|
| 7,313,793 B2 * | 12/2007 | Traut | ................. | G06F 9/4856 718/1 |
| 2008/0155223 A1 * | 6/2008 | Hiltgen | ............... | G06F 9/45558 711/173 |
| 2009/0260007 A1 * | 10/2009 | Beaty | .................... | G06F 9/5077 718/1 |
| 2010/0082922 A1 * | 4/2010 | George | ................... | G06F 9/461 711/162 |
| 2012/0054746 A1 * | 3/2012 | Vaghani | ................ | G06F 9/5022 718/1 |

(Continued)

*Primary Examiner* — Dong U Kim

(57) ABSTRACT

Instructions to fork a source VM are received, and execution of the source VM is temporarily stunned. A destination VM is created, and a snapshot of a first virtual disk of the source VM is created. A checkpoint state of the source VM is transferred to the destination VM. The source VM has one or more virtual disks. One or more virtual disks associated with the destination VM are created and reference the one or more virtual disks of the source VM. Execution of the destination VM is restored using the transferred checkpoint state and the virtual disks of the destination VM in a way that allows the source VM to also resume execution. Forking VMs using the described operation provisions destination VMs in a manner that makes efficient use of memory and disk space, while enabling source VMs to continue execution after completion of the fork operation.

20 Claims, 6 Drawing Sheets

(56) References Cited

U.S. PATENT DOCUMENTS

| | | | | |
|---|---|---|---|---|
| 2012/0124285 A1* | 5/2012 | Soran | ............ | G06F 3/0608 |
| | | | | 711/114 |
| 2012/0278553 A1* | 11/2012 | Mudhiganti | ......... | G06F 3/0647 |
| | | | | 711/114 |
| 2014/0013059 A1* | 1/2014 | Joshi | ............ | G06F 12/0815 |
| | | | | 711/144 |
| 2015/0178109 A1* | 6/2015 | Li | ............ | G06F 9/45558 |
| | | | | 718/1 |
| 2016/0048408 A1* | 2/2016 | Madhu | ............ | G06F 11/1458 |
| | | | | 718/1 |
| 2018/0217859 A1* | 8/2018 | Triplett | ............ | G06F 9/45558 |

* cited by examiner

PARENTLESS VIRTUAL MACHINE FORKING

CROSS-REFERENCE TO RELATED APPLICATION

This application claims the benefit of U.S. Provisional Application Ser. No. 62/380,435, filed Aug. 28, 2016, entitled "PARENTLESS VMFORK", the entirety of which is hereby incorporated by reference herein.

BACKGROUND

Today, instant live cloning of virtual machines (VMs) enables users to provision a live clone of a virtual machine in less than a second, and to provision thousands of live clones in a matter of seconds. Current VM fork operations require a stunned, or quiesced, VM to be the source VM, also referred to as the parent VM or origin VM, for any live replica VM, also referred to as a child VM or destination VM. A parent VM is explicitly marked as a source VM and such VMs are understood and managed by current VM systems and users differently from other VMs. For example, a parent VM cannot be restored or powered on if there is any running child VM of that parent VM, nor can such a parent VM be deleted. While the parent VM is managed by the system and consumes memory and storage resources, the parent VM remains in a permanent quiesced state unable to further execute.

That is, the parent VM cannot execute instructions while quiesced. Further, since parts of the runtime state of the parent VM are shared between the parent VM and child VM, the parent VM cannot be modified or deleted while there are children thereof. The parent VM also consumes swap space and associated in-memory metadata. Child VMs are also limited. For example, in some implementations, to power on, the child VM must be on the same host as the parent or a copy of the parent, due to sharing of runtime state. Second, device customization is limited because checkpoint state is shared. Adding or removing network devices, and/or removing storage devices is generally not possible on children VMs except when special functionality is added to the platform and management layers. This special functionality increases code complexity across the VM system, and requires substantially more engineering resources to deliver. In addition to the impact on VMs, the existing VM fork operation design is implemented across a variety of features in VM systems, leading to code sprawl, testing complexity, and performance overheads.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
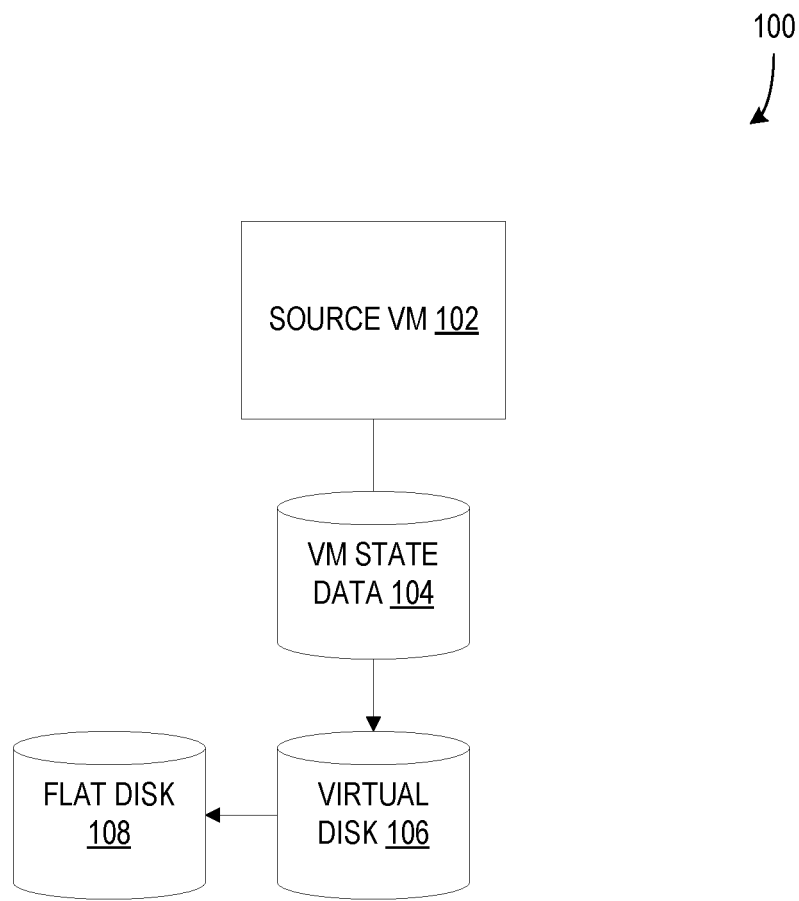
FIG. 1 is an exemplary block diagram illustrating a VM system prior to forking a destination VM from a source VM according to an embodiment.

The described virtual machine (VM) fork operation enables an administrator or other user to create powered-on VMs from the running state of another powered-on VM. The result of the described VM fork operation is a new VM that efficiently shares memory and disk state with the source VM from which it was forked while becoming independent from the source VM. The destination VM can be fully customized to ensure that critical properties, such as Internet Protocol (IP) address and host name, are unique to that destination VM. Additionally, and unlike prior versions of VM forking, the source VM may be restored to operation or otherwise resume execution after the destination VM is fully powered on.

In one example, the described VM fork operation, executed against a running source VM, causes the execution of the source VM to be temporarily stunned. While stunned, a disk snapshot is created referencing the source VM's child-most disk. Subsequently, a checkpoint of the state of the source VM is taken and transferred to the new forked VM, called the destination VM. Before restoring from this checkpoint, new writable delta disks are generated for use by the source VM and the destination VM referencing the disk snapshot of the source VM as read-only content. The destination VM then restores to a powered-on state using the checkpoint transferred from the source VM, sharing the physical memory pages of the source VM in the process. Once the destination VM is restored and resumed, the source VM resumes execution from its stunned point.

In an alternative example of the described fork operation, the source VM is stunned and a destination VM is created. The checkpoint state of the source VM is transferred to the destination VM. A virtual disk of the source VM is divided into a plurality of blocks, and a virtual disk of the same size is created for the destination VM and divided into an equivalent plurality of blocks. The source VM and destination VM are restored to operation from their respective checkpoint states (e.g., identical prior to resuming execution). During operation, when I/O operations are performed on the virtual disks of source VM and destination VM, a copy-on-write (COW) filter copies blocks affected by the I/O operation from the source VM virtual disk to the destination virtual disk prior to execution of the associated I/O operation to preserve or protect the state of the source VM virtual disk from the point of the fork operation. This allows the source VM to execute independently from the destination VM. Once all the blocks of the source VM virtual disk have been copied to the destination VM virtual disk, the fork operation is completed.

In both of the above alternative implementations, VMs created by the described fork operation have no dependency on the source VM after completion of the fork operation. This results in a significant simplification to the fork operation architecture, enabling natural support for other system features based on VM migration primitives.

The present disclosure describes a new design for instant forking, or cloning, of VMs that does not distinguish between parent and child VMs. This approach offers comparable live cloning performance with significantly simpler management and greater flexibility for users. With this approach, forking of VMs includes a VM process creating a copy of itself, and both the parent and child VMs resume execution. There is no longer a need to keep and manage a stunned, or quiesced (e.g., a permanent stunned state, etc.), source VM as a template for its child VMs and, as a result, there is no need for the management layer overhead of managed a permanently stunned source VM after the parentless fork operation is completed. Any forked destination VM exists independently of the source VM. Furthermore, this parentless VM fork operation allows users to fork different hardware configurations without a power cycle. Additionally, the described fork operation is intuitive to users, offering advantages in management and ease of use. Functioning of a computing device is improved, memory usage is reduced, and the user experience is enhanced.

This detailed description in connection with the appended drawings is intended as a description of a number of embodiments and is not intended to represent the only forms in which the embodiments may be constructed, implemented, or utilized. Although the embodiments may be described and illustrated herein as being implemented in devices such as a server, personal computer, mobile device, or the like, this is only an exemplary implementation and not a limitation. As those skilled in the art will appreciate, the present embodiments are suitable for application in a variety of different types of computing devices, for example, PCs, servers, laptop computers, tablet computers, etc.

FIG. 1 is an exemplary block diagram illustrating a VM system 100 prior to forking a destination VM from a source VM according to an embodiment. The VM system 100 comprises a source VM 102, which includes VM state data 104, a virtual disk 106, and an associated flat disk 108. The VM state data 104 includes a file or files that define the settings, configuration, or other state of the source VM 102. For instance, the VM state data 104 may include a name of the source VM 102, a memory size, an operating system that is executed on the source VM 102, version data associated with the source VM 102, and/or hardware interface settings. Further, the VM state data 104 may include state information associated with the current state of the source VM 102 at a given time. For instance, a state of the Basic Input/Output System (BIOS) of the source VM 102 and/or a state of the random-access memory (RAM) of the source VM 102 may be included in one or more files of the VM state data 104.

Virtual disks, including virtual disk 106, include a file or files that represent physical disk space for VMs, such as source VM 102. Virtual disk 106 may include data written by the source VM 102, stored software, data files, media files, etc. Further, the virtual disk 106 may include metadata for use in searching and/or managing the virtual disk 106. For instance, the virtual disk 106 may include settings with respect to how the memory of the virtual disk 106 is allocated (flat, sparse, etc.) and/or whether the data is stored as a single file (monolithic) or multiple files (split). In an example, the virtual disk 106 is configured to be "sparse", such that space is not initially allocated on the disk but disk allocation occurs as needed.

In contrast, the flat disk 108 is a virtual disk that is configured to be "flat", such that the space of the flat disk 108 is allocated in advance of it being used. Flat disks and sparse disks each provide advantages and disadvantages. In an example, the virtual disk 106 includes references (e.g., pointers, etc.) to the flat disk 108 as illustrated in FIG. 1. Elements of the source VM 102 and/or VM state data 104 (e.g., a virtual processor, etc.) may interact with the virtual disk 106 and/or flat disk 108 by writing data and/or reading data therefrom.

Figure 2:
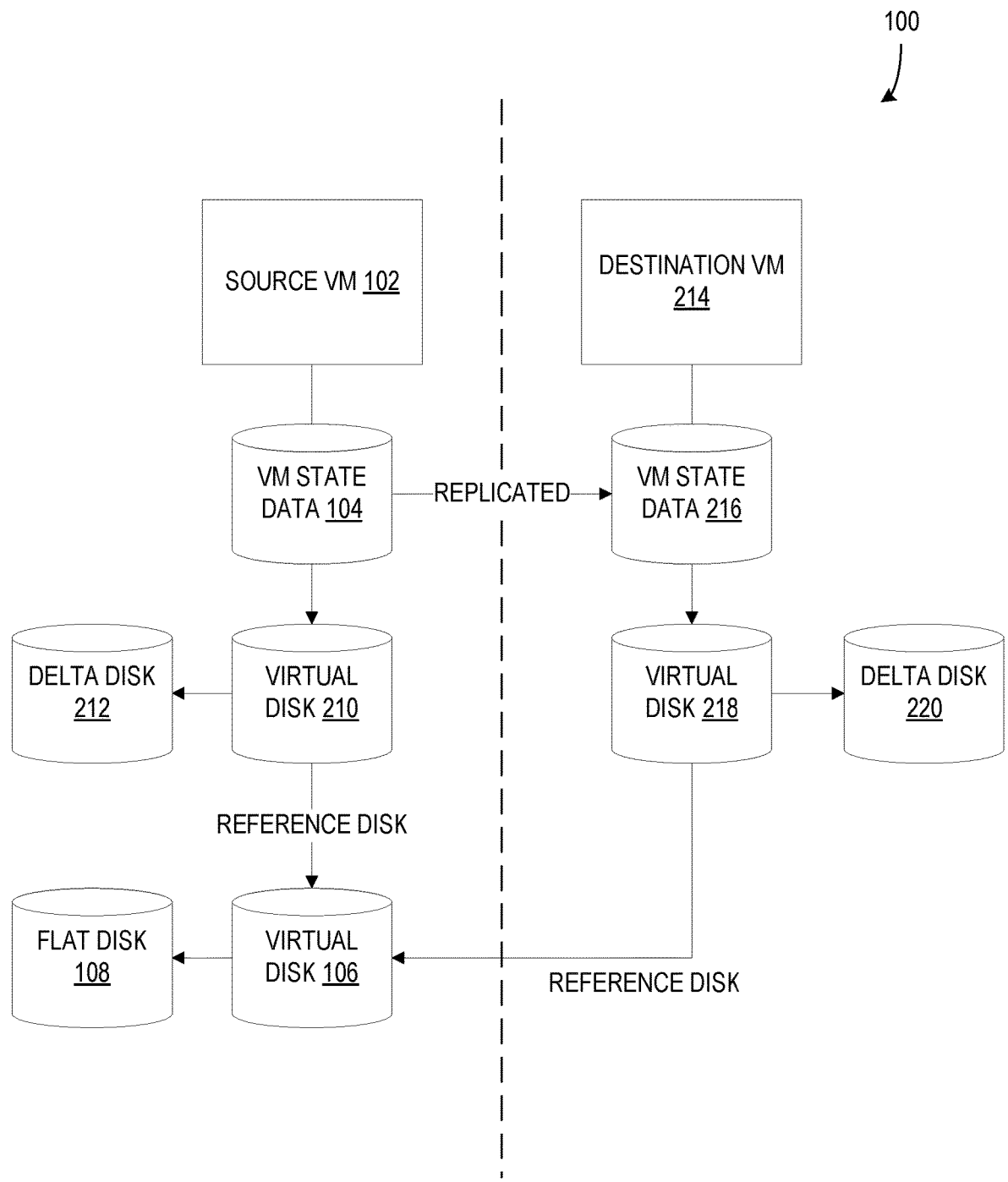
FIG. 2 is an exemplary block diagram illustrating the VM system of FIG. 1 after forking a destination VM from a source VM according to an embodiment.

FIG. 2 is an exemplary block diagram illustrating the VM system 200 as the VM system 100 of FIG. 1 after forking a destination VM 214 from the source VM 102, according to an embodiment. The destination VM 214 is forked, or cloned, from the source VM 102 by replicating the VM state data 104 as VM state data 216 associated with the destination VM 214. Further, the virtual disk 106 is preserved as a snapshot and virtual disk 210 and virtual disk 218 are created for the source VM 102 and destination VM 214 respectively to reference the snapshot virtual disk 106 as a parent disk. Delta disk 212 and delta disk 220 are created for the source VM 102 and destination VM 214 respectively for use as writable disks.

After the fork operation, both the source VM 102 and destination VM 214 continue execution from that "point in time" (PIT) state at which the source VM 102 was originally stunned. That PIT state covers, for example, memory content, virtual device state (checkpoint), and disk state. Memory is managed via copy-on-write (COW) from the source VM memory to the destination VM memory. A checkpoint save operation of VM state data (e.g., VM state data 104, etc.) is performed on the source VM (e.g., source VM 102, etc.) and replicated on the destination VM (e.g., destination VM 214, etc.).

In some examples, the source VM 102 takes the following actions during the described fork operation: publishing a source context to the kernel, creating a checkpoint of the source VM and pushing the checkpoint to a checkpoint cache in the kernel (for use in replicating the VM state data 104 to the VM state data 216), generating snapshots for each virtual disk of the source VM to serve as a new running point (e.g., a snapshot of virtual disk 106 is used by both source VM 102 and destination VM 214 after destination VM 214 is forked from source VM 102, etc.), and signaling the kernel that the checkpoint process is complete.

Similarly, in some examples, the destination VM 214 takes the following actions during the described fork operation: publishing a destination context to the kernel, polling the kernel to determine when the source VM 102 has completed a checkpoint, replicating VM state data 104 from the cached checkpoint of the source VM 102 as VM state data 216, creating a disk snapshot referencing the disks of the source VM 102, and activating, or restoring, using the replicated VM state data 216 and created disks (e.g., virtual disk 218 and delta disk 220, etc.).

In order to generate a stable checkpoint of the VM state data 104 for use by the destination VM 214, the source VM 102 triggers a VM stunning event. The source VM 102 may then register a special device using a device registration interface. The device registration interface includes a specification of a checkpoint function, which is used to either save or restore a checkpoint. Checkpointing in the source VM 102 serializes VM state data 104 in the checkpoint for replication in the destination VM 214. The VM state data 104 may include a count of associated virtual disks, a disk ID for each virtual disk, a path to each disk, a content ID of each disk, a path to a RAM file of the source VM 102, BIOS and/or Extensible Firmware Interface (EFI) data of the source VM 102, etc.

As part of the checkpoint save process, the checkpoint is pushed to the kernel for future retrieval by the destination VM 214 (e.g., replicating the VM state data 104 as the VM state data 216, etc.). Once the checkpoint save is complete, the source VM 102 sends a signal to the kernel that the source VM 102 is checkpointed and fully suspended. This event drives a state change in the kernel to trigger the destination VM 214 restore event.

The copying of the source VM's disk state to the destination VM is relatively expensive process from a time perspective. To reduce this cost, the described fork operation may include snapshot-based operations such as copying delta disks (e.g., delta disks 212 and 220, etc.) on top of a common shared based disk (e.g., virtual disk 106, etc.) and/or using native snapshots to create a copy of the source VM's disk content.

Leveraging disk snapshots to share disk state between source VM 102 and destination VM 214 may enhance space efficiency at the fork point, as all existing data from the source VM 102 is efficiently shared with the destination VM 214. Additionally, disk snapshots are relatively inexpensive to generate in terms of latency, and disks backed by delta disk-based snapshots are provided with a new, empty, writable child-most disk (e.g., a virtual disk that has not been snapshotted for use in a fork operation, etc.).

Snapshots store and provide a consistent, reusable point-in-time state of persistent storage associated with a VM. In some examples, snapshots are treated as read-only datastores after creation. There are 2 primary classes of snapshots: delta disk snapshots and native snapshots. The architecture for delta disk snapshots is effectively a redirect-on-write architecture. In a delta disk datastore, a virtual disk is represented by a disk chain, or disk hierarchy (e.g., virtual disks 106 and 210, flat disk 108, and delta disk 212 forms such a disk chain or hierarchy, etc.). This disk hierarchy represents the logical block address (LBA) space of the virtual disk, with each layer of the disk hierarchy being a sparse extent of the LBA space, holding different generations of each LBA. When a VM reads a block of data from a virtual disk, that block read is first attempted to be satisfied by the child-most (aka "leaf") disk in the hierarchy. If the leaf disk does not contain the requested data, then the kernel continues attempting to satisfy that read request by walking up the chain until it reaches the base disk, aka the top of the hierarchy. The base disk is guaranteed to logically satisfy the read IO, either with valid data written to the disk, or with zeros. For instance, when accessing data on the source VM 102 of VM system 200, the delta disk 212 would be tried first as the child-most disk of the source VM 102. If the sought data is not present on delta disk 212, the virtual disk 106 and/or flat disk 108 may be accessed as the base disks of the system. Generally, each delta disk layer in the hierarchy may function as a snapshot point. As snapshots are taken of the virtual disk, a new, empty delta disk is inserted as the new leaf node of the hierarchy, and the previous leaf node is considered a logical snapshot point.

In the VM system 200, delta disks are used to preserve the source VM's data. The source VM 102 is provided a delta disk 212 to contain its subsequent writes, and the destination VM 214 is provided another delta disk 220 for subsequent writes. If another VM is forked from either the source VM 102 or destination VM 214 (the target VM with respect to the new fork operation), the same protocol is followed again, giving the target VM another delta disk, with the new destination VM's virtual disk pointing to the target VM's previous delta disk. The hierarchy of disks is not collapsed, since at least one VM depends on each level of disks in the hierarchy. The delta disk hierarchy is made deeper with each fork request. In some examples, delta disks may be generated as described for each snapshot-supported virtual disk associated with the source VM.

Figure 3:
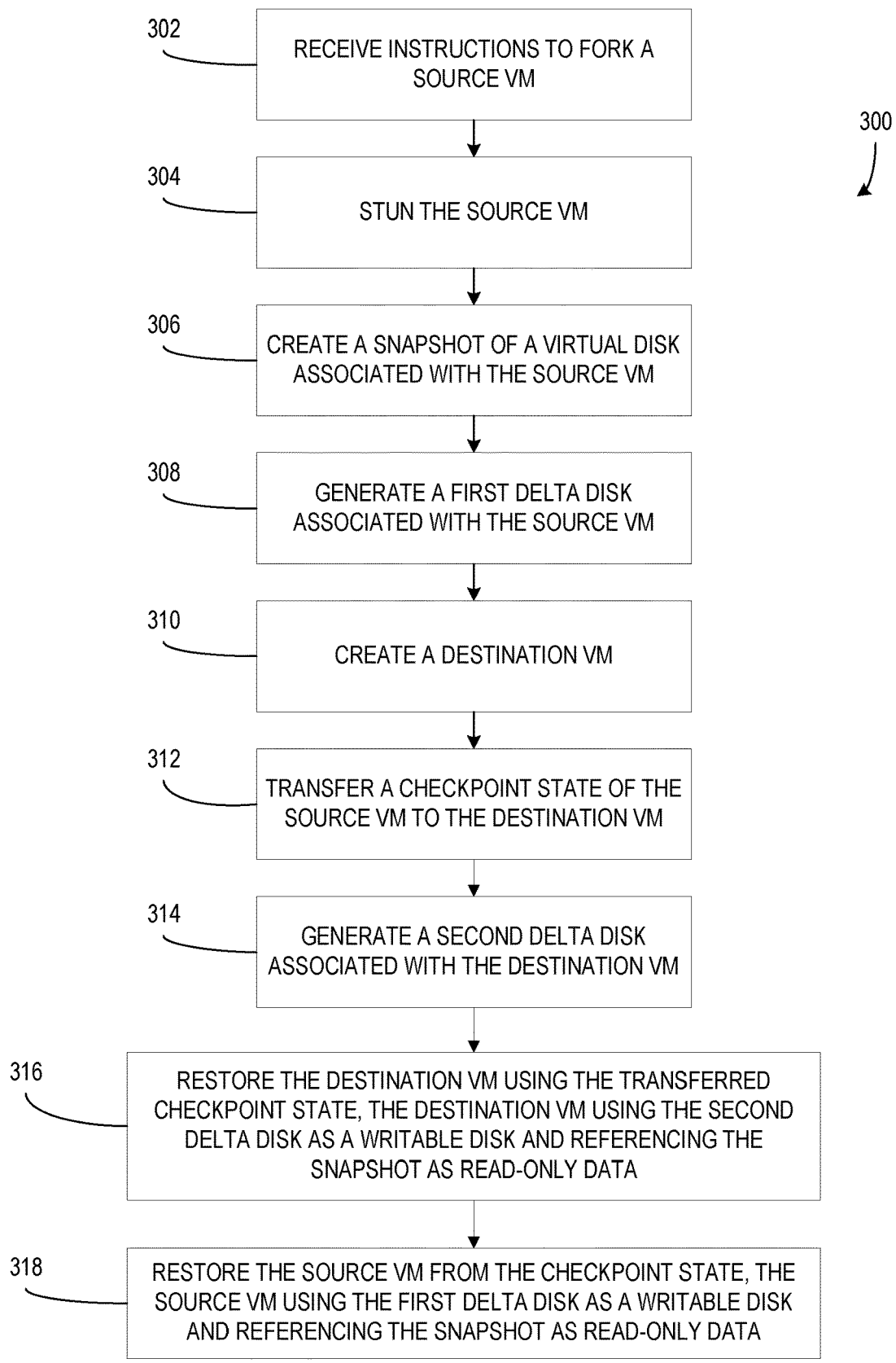
FIG. 3 is an exemplary flow chart illustrating a method of forking a destination VM from a source VM using delta disks and restoring execution of both the destination VM and source VM according to an embodiment.

FIG. 3 is an exemplary flow chart illustrating a method 300 of forking a destination VM from a source VM using delta disks and restoring execution of both the destination VM and source VM according to an embodiment. At 302, instructions are received to fork a source VM using the fork operation described herein. At 304, the source VM is stunned such that it stops executing commands and its state is preserved. In an example, descriptors of the source VM and the destination VM are identified and bound together. Then, a checkpoint cache is generated to store the checkpoint state of the source VM. The checkpoint cache may be stored at the kernel level of the VM system. An estimated heap size may be calculated for each of the source VM and the destination VM. The source VM heap size is calculated to be large enough to hold the source VM descriptor and the checkpoint cache. The destination VM heap size is calculated to be large enough to hold the central processing unit (CPU) load history.

At 306, a snapshot is created of a virtual disk of the source VM (e.g., virtual disk 106, etc.). In some examples, the source VM includes a plurality of virtual disks prior to the described fork operation (e.g., virtual disk 106, flat disk 108, etc.). Further, the plurality of virtual disks of the source VM may be in the form of a delta disk hierarchy and the virtual disk of which the snapshot is created is the child-most disk of the hierarchy. The snapshot saves the state of the first virtual disk for use in forking VMs from the source VM as described herein.

At 308, a first delta disk associated with the source VM is generated. In some examples, the delta disk may include addresses that reference the snapshot of the source VM's virtual disk as read-only data as well as disk space for subsequent data writes. (e.g., virtual disk 210 may comprise address space referencing the virtual disk 106 and delta disk 212 may comprise disk space for subsequent data writes, etc.) The second delta disk may be used in conjunction with one or more of the disk sharing implementations described herein (e.g., delta disk hierarchies, indexed delta disks, etc.).

At 310, a destination VM is created. Destination VM creation may include an initial allocation of disk space and/or memory to the destination VM and other initialization operations. In some examples, the creation of the destination VM occurs before or during the stunning of the source VM or the creation of the snapshot. Further changes to the destination VM (e.g., checkpoint replication, disk generation, etc.) are done once the source VM stun has completed and the snapshot has been created. The source VM may provide indicators to the kernel of the system upon completion of the stun and/or creation of the snapshot, such that the destination VM can detect the indicators via periodic polling of the kernel.

At 312, a checkpoint state of the source VM is transferred, or replicated, to the destination VM such that the destination VM acquires the same state as the source VM at the point in time that the source VM was stunned. In some examples, transferring the state of the source VM includes marking the memory of the source VM as copy-on-write (COW) for sharing with the destination VM. Copied memory files may include, for instance, BIOS and/or EFI state information, swap file information, or the like. All memory state of the source VM is replicated to the destination VM and all memory pages of the source VM are configured to be shared with the destination VM. Certain elements of the state of the source VM may not be transferred to the destination VM to avoid file locking issues or the like at later points in the fork operation (e.g., VM-specific identifiers, VM-specific configuration settings, etc.).

At 314, a second delta disk associated with the destination VM is generated (e.g., delta disk 220, etc.). In some examples, the second delta disk may include addresses that reference the snapshot of the source VM's virtual disk as read-only data as well as disk space for subsequent data writes (e.g., virtual disk 218 may comprise address space referencing the virtual disk 106 and delta disk 220 may comprise disk space for subsequent data writes, etc.) The second delta disk may be used in conjunction with one or more of the disk sharing implementations described herein (e.g., delta disk hierarchies, indexed delta disks, etc.).

At 316, the destination VM is restored to operation based on the transferred checkpoint state from the source VM. At 318, the source VM is restored to operation from the checkpoint state as well. Both the destination VM and the source VM, when restored, use their respective delta disks as writable disks while also referencing the snapshot as read-only data. The snapshot is essentially frozen and will remain unchanged throughout the operation of the destination VM.

Variations of the above workflow for the described fork operation are contemplated, and within the scope of the disclosure.

Figure 4:
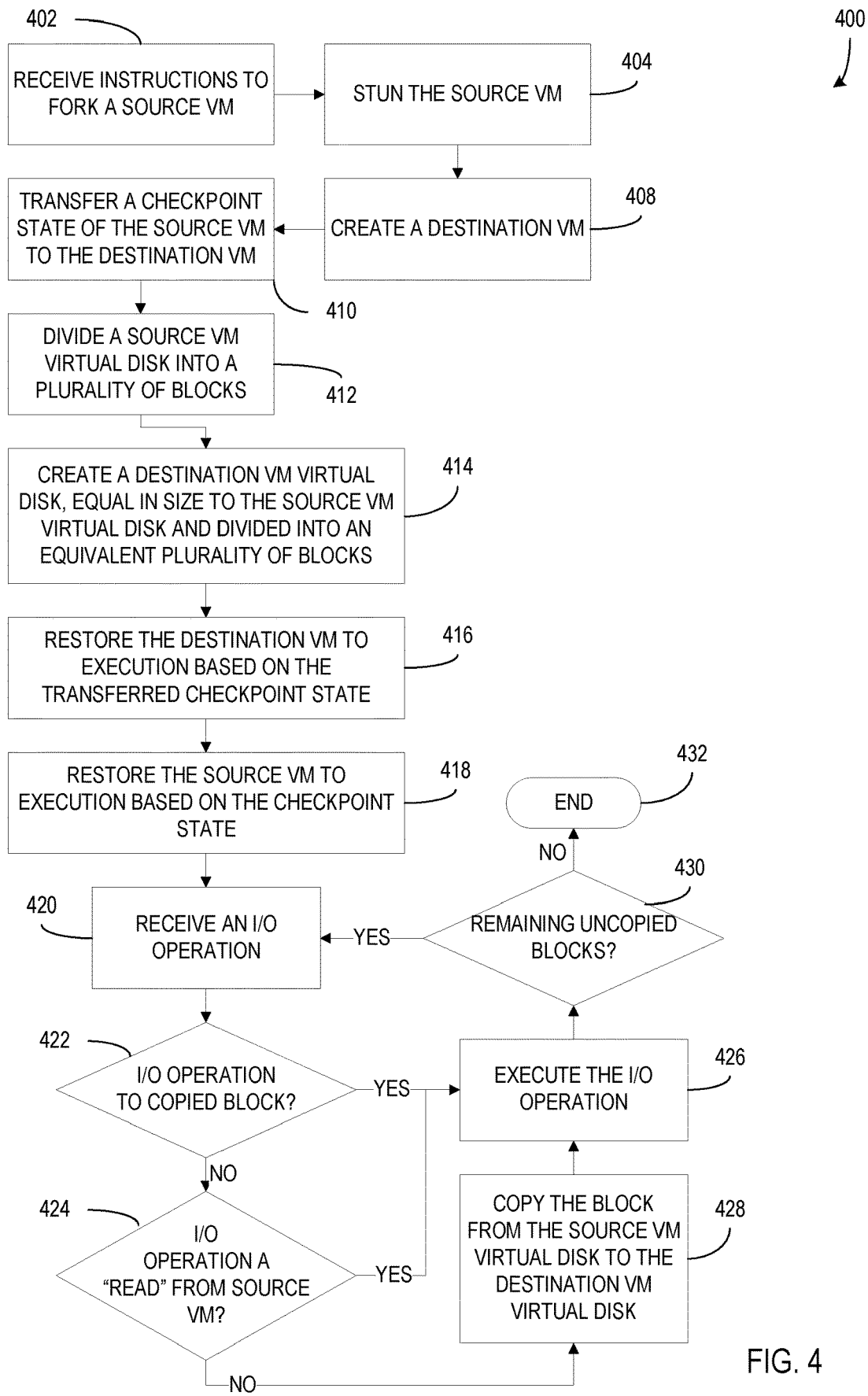
FIG. 4 is an exemplary flow chart illustrating a method of forking a destination VM from a source VM using native snapshots with copy-on-write filters and restoring execution of both the destination VM and source VM according to an embodiment.

Alternative implementations leverage copy-on-write (COW) disk blocks (e.g., such as in a Virtual Machine File System (VMFS), etc.) by using block reference counting capabilities. FIG. 4 is an exemplary flow chart illustrating a method 400 of forking a destination VM from a source VM using native snapshots (e.g., snapshots implemented in a storage layer, etc.) with copy-on-write filters and restoring execution of both the destination VM and source VM according to an embodiment. Taking such snapshots includes traversing the disk and reference counting all blocks therein. At 402, instructions are received to fork a source VM, the source VM is stunned at 404, a destination VM is created at 408, and a checkpoint state is transferred from the source VM to the destination VM at 410, as described above.

At 412, a source VM virtual disk is divided into a plurality of blocks. In some examples, the source VM may include multiple virtual disks, and each of the virtual disks may be divided into blocks. At 414, an empty, thin virtual disk of equal size is created for use by the destination VM. The destination VM virtual disk is divided into equivalent blocks to the source VM virtual disk. An initial linear pass through the disks may occur that reference counts the disk blocks of the destination VM disk against the disk blocks of the source VM disk to confirm synchronization thereof.

The destination VM begins restoring from the transferred source VM checkpoint state at 416, marking all disk space as COW against the source VM. Further, the source VM is restored to operation based on the checkpoint state at 418, as described above. A COW filter is placed on each disk to enforce COW for each destination VM disk with respect to respective source VM disks. Once the COW filter has completed a full pass of each destination VM, the fork operation is complete.

The COW filter reference counts the disk blocks of destination VM disks against the disk blocks of the source VM disks. The COW filter then intercepts all input/output operations (I/O) associated with the source VM and the destination VM at 420. Any attempt to read or write to a block that has already been addressed by the COW filter (e.g., the block has already been copied from the source VM virtual disk to the destination VM virtual disk, etc.) is allowed through the filter at 422 and executed at 426.

Reads or writes to blocks that have not been addressed by the COW filter are handled differently. If the I/O operation is a read to a source VM disk block by the source VM, it is allowed through at 424 and executed at 426. If the I/O operation is a write to a source VM disk block 424 from the source VM, the block is synchronously copied to the equivalent destination VM disk block at 428 and the write is then allowed by the source VM to the source VM disk block at 426.

If the I/O operation is a read to a destination VM disk block at 424 by the destination VM and that block has not previously been copied from the equivalent source VM disk block, the block is synchronously copied from the equivalent source VM disk block at 428, and then the read is allowed at 426 by the destination VM from the copy. Similarly, if the I/O operation is a write to a destination VM disk block at 424 by the destination VM and that block has not previously been copied from the equivalent source VM disk block, the block is synchronously copied from the equivalent source VM disk block at 428, and then the write is allowed to the destination VM disk block at 426 by the destination VM.

In some examples, after an I/O operation is executed at 426, if there are remaining uncopied blocks at 430, the flow returns to receiving I/O operations at 420 via the COW filter(s). If there are no remaining uncopied blocks at 430, the COW filter operation is completed at 432.

In an example, a method for forking a VM comprises: receiving instructions to fork a source VM; stunning the source VM; creating a destination VM; transferring a checkpoint state of the source VM to the destination VM; dividing a source VM virtual disk into a plurality of blocks; creating a destination VM virtual disk, equal in size to the source VM virtual disk and divided into an equivalent plurality of blocks; restoring the destination VM using the transferred checkpoint state; restoring the source VM to execution based on the checkpoint state; based on receiving an I/O operation associated with an uncopied block of the source VM virtual disk or the destination VM virtual disk, copying the uncopied block from the source VM virtual disk to the destination VM virtual disk prior to executing the I/O operation.

In another example, reads on destination VM disk blocks may be relayed to the equivalent source VM disk block. This may provide optimization in certain scenarios, avoiding synchronous copy operations on reads.

By using the COW disk block method described above, destination VMs are up and running immediately, able to perform I/O operations and issue guest instructions. The fork operation completes after the disk COW filter completes a pass through all the disks, which may take about another second. For failure modes, the destination VM and/or its disks are marked to remember whether the COW filter finished or not to ensure nothing interferes with the disks in the event of a host crash or the like.

In another alternative example, the COW disk block workflow described above may be performed, but with explicit block copying (e.g., leveraging a virtual storage area network (VSAN) or other system with deduplication capability, etc.).

In yet another alternative example, guest execution may overlap with the COW disk block fork operation described above (e.g., leveraging VStorage Application Programming Interface (API) for Array Integration (VAAI) network attached storage (NAS), etc.).

In a further alternative example, snapshot creation time may overlap with guest execution. For instance, I/O may temporarily be issued to a delta disk, then consolidated to both VMs after the snapshot has been created successfully.

A different snapshot format may be used in other examples. In an input/output (I/O) efficient snapshot format, the number of I/O operations that are issued to satisfy the virtual I/O of the VM is strictly bound. This I/O efficient snapshot format may be used with the COW filter techniques described above or with other similar snapshot methods and techniques. Instead of using a hierarchical tree to represent a virtual disk, a virtual disk is represented as a wide, but flat set of disks containing persistent data (e.g., flat disk 108, etc.). In some examples, each virtual disk contains two classes of persisted data: a data location index (e.g., the virtual disk 106, etc.) and a set of physical data extents, areas, locations, etc. (e.g., the flat disk 108, etc.), which may be shared.

The data location index is a sparse index of mappings from logical block addresses to physical block addresses in backing physical extents. The physical data extents contain the actual persisted data for the virtual disk. These physical data extents can be shared amongst VMs and among snapshots of a given VM.

In an example, a new virtual disk is provided with an empty data location index. As data is written to the new virtual disk, data is persisted in free or unallocated physical extents and the logical block address to physical address mappings are maintained in the data location index. Reads are satisfied by deterministically and quickly identifying the location of the data from the data location index.

A snapshot operation against an I/O efficient virtual disk includes preserving the data location index at the time of snapshot for other VMs to leverage. A snapshot does not require replication of any data extents. The virtual disk is provided with a new data location index that contains a full replica of the snapshotted data location index. IOs against the virtual disk are satisfied by the new data location index. A VM that is created using the virtual disk snapshot starts with their own writable copy of the snapshot data location index.

With I/O efficient snapshot architecture, increased latency for a disk snapshot and decreased space efficiency (both due to data location index replication) are traded for bounded I/O latency that does not degrade as the number of snapshots grows. Space efficiency is maintained, as data blocks are shared across snapshots and across VMs. I/O efficiency in the face of I/O scalability is achieved, as the number of I/O operations required to satisfy a read or a write is strictly bounded, regardless of the number of snapshots of the virtual disk. Writes typically involve writing data to a bounded number of physical data extents, plus updating and/or maintaining the associated data location index. Reads typically involve reads of the data location index to identify the data extent locations, followed by reads of identified data extents to satisfy the read.

With such an architecture, the physical data extents may be viewed as a global universe of data, shared amongst all VMs. Aspects of the disclosure contemplate a deduplication layer built across hosts sharing the same datastore to achieve even better space efficiency.

In another exemplary snapshot format, an indexed delta disk provides that there is never more than one level of indirection. The indexed delta disk snapshot format may be used with a delta disk system generally to flatten the disk hierarchy and/or with the COW filter snapshot techniques described above. Each logical indexed disk contains an index map and a set of data extents that reside in that disk. The lifecycle of an indexed disk throughout some repeated fork operations may be as follows. A fresh VM using an unshared disk is allocated an empty, or unallocated, disk with data extents vacant or populated depending upon the associated zeroing behavior. Subsequent writes to this disk write data extents and update the index entries to reference the internal extents. Reads reference the index to determine if the extent is present. If present, the data is read from the corresponding internal extent.

Once the initial disk is forked, (e.g., due to a fork operation as described herein, etc.), the source VM and destination VM are provided with new indexed disks. The index of the base shared disk is replicated to the index of the source/destination indexed disks, with index entries updated to point to the external shared base disk. No data extents exist at this point in the new source/destination indexed disks as all the data still resides in the base shared disk.

The source VM and destination VM continue to operate on their respective child-most disks. New writes are written to unused data extents on the source and destination indexed disks respectively, resulting in new index entries referencing the newly written data extents. Partial writes to existing extents in the base disk result in COW operations, pulling in existing data from the base disk and overlaying the new data into an extent in the source or destination indexed disks respectively, followed by an update to an index entry to point to the internal extent of the source or destination indexed disk. Full extent overwrites eliminate the reads from the base disk with respect to the overwritten data extent and are simply full extent writes to the source or destination indexed disks and an associated index update. Reads are fulfilled by first referencing the index to determine an extent existence and location, followed by an internal or external data extent read.

Further, a second fork of an indexed disk (e.g., the source indexed disk, etc.), preserves the state of the source's current child-most indexed disk. But instead of adding that disk into a disk hierarchy as described previously, the hierarchy is flattened, which may avoid negative performance implications of developing a deeper disk hierarchy. Again, a new indexed disk is created for the source VM and one for the new destination VM, performing the same index replication and reference management as in the first fork described above. This results in a naturally developing flat and wide hierarchy where the number of hops to fulfilling read I/Os is bounded and the number of hops to committing partial writes is bounded. Additional I/O may be performed to update the index, though any performance degradation may be reduced with an index, such as a sequential log-style file format. The result is reduced I/O amplification and reduced I/O latency, partially due to reduced I/O amplification and partially due to reduction in number of disks touched.

This exemplary snapshot format may contemplate an increasing amount of I/O operations at fork time due to the index replication and management phase, leading to increased stun time for the source VM. The COW filter described herein may be used in concert with the indexed delta disk to reduce the impact of this replication time.

In some examples, the VMs, (e.g., source VM 102, destination VM 214, etc.), including the VM state data and virtual disks are stored in one or more datastores. All datastore types are supported. Virtual Machine File System (VMFS) and Networked File System (NFS) leverage delta disk snapshots, described above, to provide low-latency sharing of storage between source and destination VMs. Other datastore types (e.g., Virtual Volume (VVOL), VSAN and VAAI, NAS, etc.) may leverage native snapshots. Changing the destination datastore, as well as datastore type, at fork time, is supported.

All VMs forked according to the description herein may be migrated between datastores and/or physical servers. The stun, or quiesce, behavior described herein puts the source VM (e.g., source VM 102, etc.) in a less restrictive "paused" state. VMs in a paused state can receive commands from the control plane and as a result, they can be migrated. The VM state (running or paused) is preserved in the migration checkpoint and then the VM is resumed in the original state at the destination.

A destination VM (e.g., destination VM 214, etc.) forked from a source VM (e.g., source VM 102, etc.) as described herein has few limitations with respect to the source VM after the fork process is complete. For instance, a forked VM has no limitations with respect to subsequent fork or clone operations. In some examples, rather than restoring a paused VM after a fork operation, the paused VM may be powered off from the paused state. For instance, a forked VM has no limitations with respect to subsequent fork or clone operations. Further, a forked VM has no limitations with respect to being relocated or migrated while powered off. The forked VM may be relocated between hosts, resource pools, datastores, and across virtual machine server instances. Migration of a forked VM in an active or paused state is also supported (e.g., vMotion®, Storage vMotion®, xvMotion®, and Cross-VC vMotion®, etc. by VMware, Inc.).

In some examples, a resource scheduler module, software that balances computing workloads with available resources in a virtualized environment, may be integrated with source and destination VMs and the fork operation described herein. For instance, the resource scheduler module may be configured to place a destination VM on the same host as the source VM by default during the fork operation. Alternatively, or additionally, the resource scheduler module may be configured to proactively relocate and/or migrate VMs on a host to clear space for a destination VM forked from a source VM. All VMs involved in a fork operation may also be relocated or migrated to balance space and/or resources of the system. Further in the event a host needs to be cleared of VMs, such as for maintenance, all VMs thereon may be relocated and/or migrated. In cases where a host fails, a source or destination VM may be restarted on a new host.

In some examples, after the destination VM is restored to operation, reconfiguration and/or guest customization are performed. Reconfiguration in the context of a forked VM includes, but is not limited to: adding and/or removing a virtual CPU, adding, removing, and/or managing virtual memory, and adding, removing, and/or editing associated virtual devices.

Further, guest customization may be done to a source or destination VM during or after the fork process. Guest customization does not require a reboot of the source or destination VM, though NICs of the destination VM may be deactivated to avoid IP address and Media Access Control (MAC) address conflicts with the source VM. Guest customization operations include, but are not limited to, MAC address assignment, Internet Protocol (IP) address assignment, and Hostname customization. In some examples, guest customization may require defined customization tools (e.g., VM Tools® by VMware, Inc., etc.) to be present in the source and destination VMs. In addition, Application Programming Interfaces (APIs) may enable an administrator or other user to specify their own source and destination customization executables.

In an example, a new API primitive is provided to enable the creation of a new VM from the running point of an existing VM via a fork operation as described herein:
@changing @feature("vmfork")
  @wsdlName("InstantClone")
  @privilege("VirtualMachine.Provisioning.Clone")
  @task VirtualMachine instantClone(vim.vm.InstantCloneSpec spec)
    throws TaskInProgress,
    InvalidState,
    InvalidDatastore, FileFault,
    InsufficientResourcesFault,
    CustomizationFault;

Additionally, an optional API and/or configuration specification may be supported to provide the API consumer with a method to prepare a source VM for customization and/or customize virtual hardware for a VM.

The fork operation workflow may be optimized by providing a bulk API capable of creating numerous destination VMs at the same time. The destination VM creations may occur concurrently, where the source VM is stunned only once to transfer state associated with all the new destination VMs. This also contemplates intelligent caching to keep the source VM's disk state temporarily in memory, rather than needing to read it for copy multiple times.

Failure of a fork operation may be detected based on a timer that is started upon the initiation of the fork process. If a defined time is exceeded for the fork operation, or for one or more of the stages of the fork operation, it is considered to have failed. In the case of a failure of the fork operation, the source VM may be configured to handle cleanup of intermediate disk states. For instance, the source VM may clean up any created source disk snapshots, destination VM state and/or configuration files, destination VM disk snapshots, etc.

For the source disk snapshots that remain after a failed fork operation, cleanup may include leaving the delta disk in place as the running point for the VM or consolidating the delta disk with the other disks for the source VM and removing the delta disk.

In the case of a successful fork operation, instructions to resume operation may be sent to both the source VM and the destination VM. If the fork operation is unsuccessful, instructions may be sent to only the source VM to resume, as the destination VM has not been properly cloned from the source VM. Further, after the fork operation, allocated resources associated with the fork operation, such as the checkpoint cache, may be freed.

In an example, the above fork operation workflow may be run as a single execution thread context for all the actions in the workflow queue. The workflow may be created using a constructor. Actions may be added to the workflow and dequeued in the order that they are added. The list of actions describes the entire fork operation. The workflow is responsible for dequeuing each action, scheduling it to run and executing it. After the execution of each action, the workflow stores the output result in the fork operation's context for actions further in the queue. The workflow contains members that enable sharing of resources between actions in the workflow. For instance, the workflow may include a context member, an action handler member, an output member, a queued action member, etc.

In an example, a user may choose to optionally quiesce the source VM and prevent it from resuming. Using a parameter in the API input specification, the user can halt the running source at a controlled point, which allows any created destination VMs to resume running from the point in time determined by the user. This control allows for behavior similar to other known VM fork techniques (e.g., the previous version of VMFork, etc.) in which the user desires exact replica VMs with identical memory.

In an example, the API of the fork operation described herein (e.g., Parentless VMFork, etc.) also supports injection of user-defined information into the destination VM. This information injection allows for the support of user-defined customization, which is useful in the case that a default customization does not fit the users' needs.

Additional Example Scenarios

In an example, a fork instruction is received by a running source VM without a guest interaction and produces an identical destination VM. The source VM resumes execution of guest instructions after the fork from its previous state.

In another example, a source VM is placed in a stunned state based on an instruction from a user. The source VM is configured to not resume, as the user dedicates it for repeated forking from its current state. The source VM is forked multiple times and produces identical destination VMs each time. The destination VMs are then resumed from the state in which the source VM is stunned.

In a further example, after the stunned source VM is used to fork a plurality of destination VMs, a user provides a resume instruction to the source VM. The source VM resumes execution from the state in which it was stunned.

In another example, a fork operation is performed on a running source VM into a pre-existing, powered-off destination VM. This creates a powered-off VM that executes from the state of the source VM when powered on.

In an example, Transparent Page Sharing is used with a destination VM generated via a fork operation, such that it shares all physical memory pages with the associated source VM. Page sharing provides a significant benefit as it enables high memory efficiency for read-only memory. It also defers memory utilization for memory pages that is not frequently written to. All VMs that are forked from the same source VM share un-modified memory pages, enabling a dense population of VMs on a host.

In some examples, users of a desktop environment expect and require a low-latency experience. However, a common problem in virtual desktop instance (VDI) environments is the "boot-storm". A boot storm occurs when there is excessive compute and I/O load put on the VDI solution because of many users arriving at the same time, (e.g., at 9 am on a work day, etc.). The result of a boot storm typically results in high latency, and therefore a bad-user experience. When integrated with a VDI system, the described fork operation can minimize the boot-storm severity by reducing the amount of load put on the VDI system. Each VDI can be forked to a predictable, initial state, thus reducing the time to productivity for each user. In addition, the memory sharing aspect of the described fork operation enables a much higher desktop-per-server density.

In some examples, modern, distributed applications, (e.g., "Web-scale applications", etc.), require an architecture that scales as demand and load increases. Auto-scaling web services in combination with the described fork operation can be leveraged to provide a low-latency, low-overhead auto-scaling service for private clouds or the like. The described fork operation enables an auto-scaling architecture that provides "Just-in-Time" resource allocation, without the latency of a full Guest Operating System boot.

Exemplary Operating Environment

While some virtualized embodiments are described with reference to VMs for clarity of description, the disclosure is operable with other forms of virtual computing instances (VCIs). A VCI may be a VM, a container, and/or any other type of virtualized computing instance.

Certain examples described herein involve a hardware abstraction layer on top of a host computer (e.g., server). The hardware abstraction layer allows multiple cloud instances (e.g., VMs, containers, or the like) to share hardware resource. These cloud instances, isolated from each other, have at least a user application running therein. The hardware abstraction layer thus provides benefits of resource isolation and allocation among the cloud instances. In some of the examples herein, VMs are used as an example for the cloud instances and hypervisors as an example for the hardware abstraction layer. Each VM generally includes a guest operating system in which at least one application runs.

It should be noted that these examples may also apply to other examples of cloud instances, such as containers not including a guest operating system, referred to herein as "OS-less containers" (e.g., "Docker" software (www.docker.com), etc.). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Figure 5:
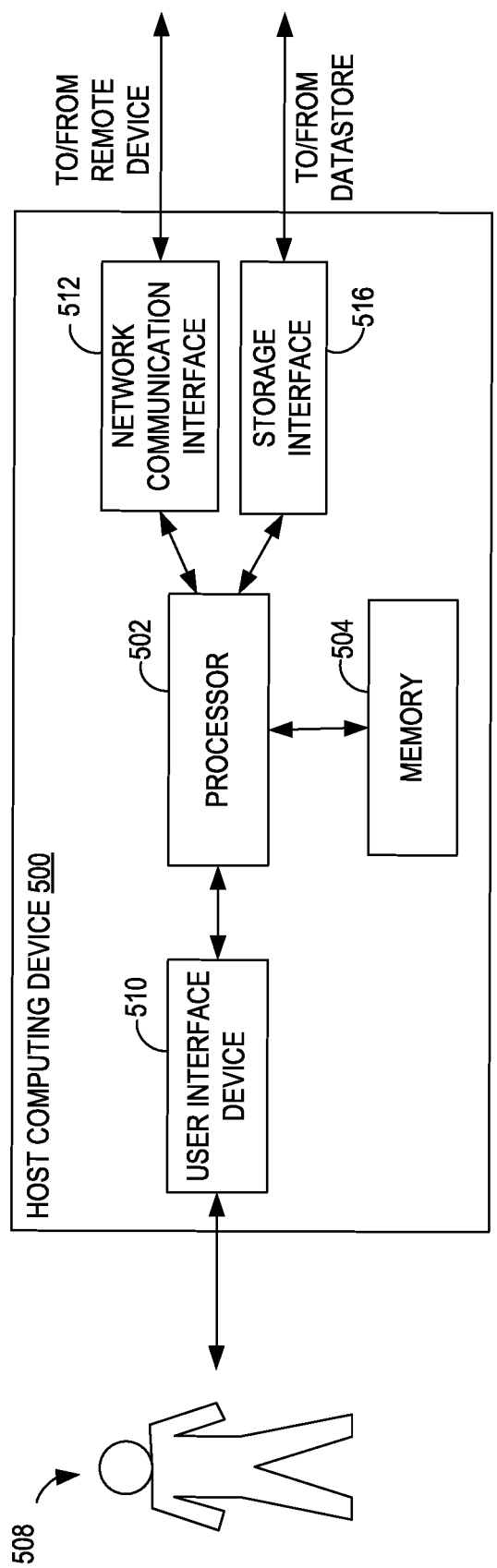
FIG. 5 illustrates a block diagram of an exemplary host computing device according to an embodiment.

FIG. 5 is a block diagram of an example host computing device 500. Host computing device 500 includes a processor 502 for executing instructions. In some examples, executable instructions are stored in a memory 504. Memory 504 is any device allowing information, such as executable instructions and/or other data, to be stored and retrieved. For example, memory 504 may include one or more random access memory (RAM) modules, flash memory modules, hard disks, solid state disks, and/or optical disks.

The disclosure is operable with any computing device, such as a host computing device 500. The host computing device 500 may share access to multiple underlying storage devices (e.g., memory 504, etc.). The underlying storage devices, in some examples, includes a synthetic block device, such as a virtual machine disk (VMDK), a common internet file system (CIFS), a NFS, virtual hard drive (VHD), or NAS.

Host computing device 500 may include a user interface device 510 for receiving data from a user 508 and/or for presenting data to user 508. User 508 may interact indirectly with host computing device 500 via another computing device such as a device running VMware's vCenter Server or other management device. User interface device 510 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 510 operates to receive data from user 508, while another device (e.g., a presentation device) operates to present data to user 508. In other examples, user interface device 510 has a single component, such as a touch screen, that functions to both output data to user 508 and receive data from user 508. In such examples, user interface device 510 operates as a presentation device for presenting information to user 508. In such examples, user interface device 510 represents any component capable of conveying information to user 508. For example, user interface device 510 may include, without limitation, a display device (e.g., a liquid crystal display (LCD), organic light emitting diode (OLED) display, or "electronic ink" display) and/or an audio output device (e.g., a speaker or headphones). In some examples, user interface device 510 includes an output adapter, such as a video adapter and/or an audio adapter. An output adapter is operatively coupled to processor 502 and configured to be operatively coupled to an output device, such as a display device or an audio output device.

Host computing device 500 also includes a network communication interface 512, which enables host computing device 500 to communicate with a remote device (e.g., another computing device) via a communication medium, such as a wired or wireless packet network. For example, host computing device 500 may transmit and/or receive data via network communication interface 512. User interface device 510 and/or network communication interface 512 may be referred to collectively as an input interface and may be configured to receive information from user 508.

Host computing device 500 further includes a storage interface 516 that enables host computing device 500 to communicate with one or more data storage devices, which store virtual disk images, software applications, and/or any other data suitable for use with the methods described herein. In some examples, storage interface 516 couples host computing device 500 to a storage area network (SAN) (e.g., a Fiber Channel network) and/or to a NAS system (e.g., via a packet network). The storage interface 516 may be integrated with network communication interface 512.

Figure 6:
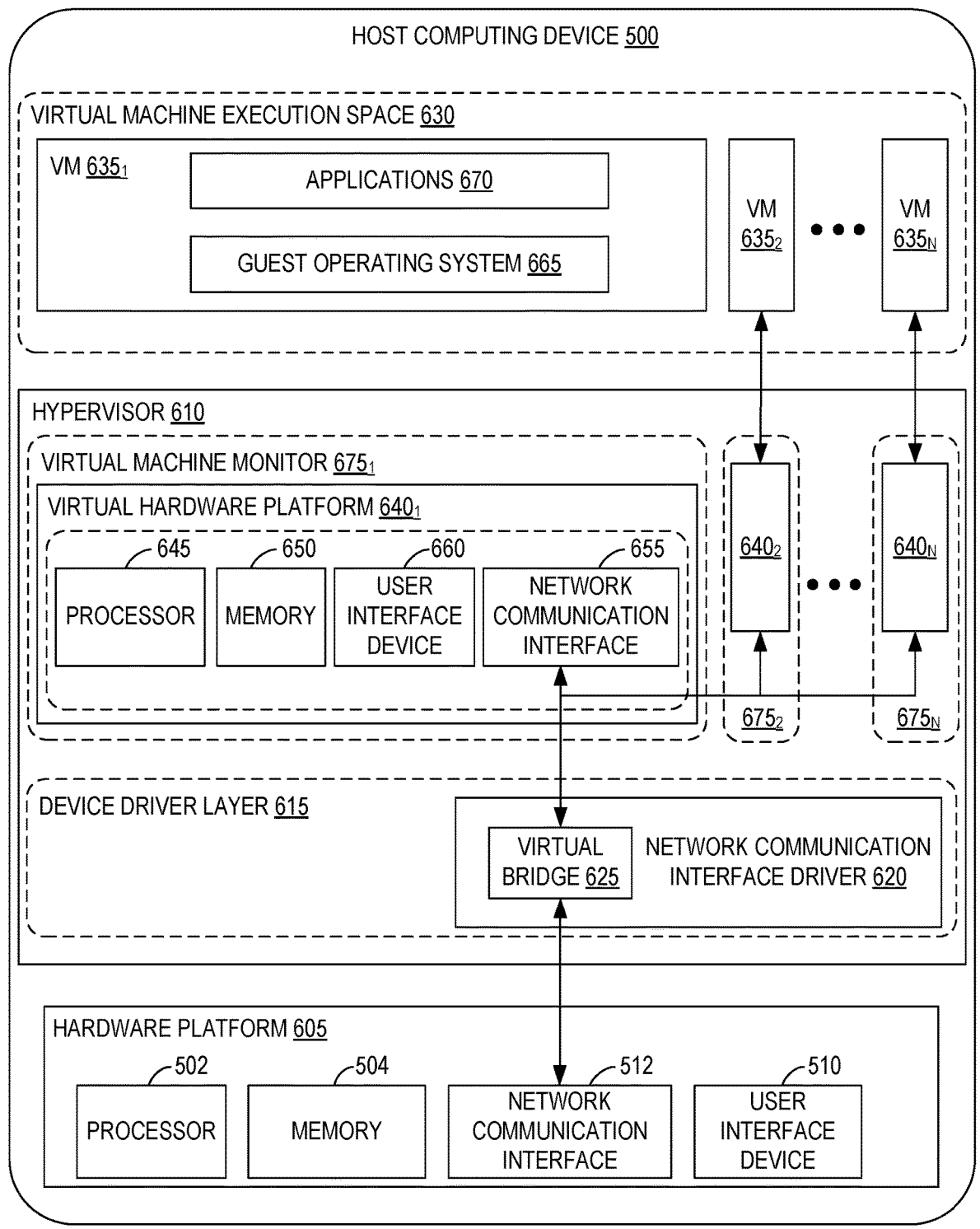
FIG. 6 illustrates a block diagram of VMs that are instantiated on a computing device, such as the host computing device shown in FIG. 5.

FIG. 6 illustrates a block diagram of VMs $635_1$, $635_2$ . . . $635_N$ that are instantiated on a host computing device, such as the host computing device 500 shown in FIG. 5. Host computing device 500 includes a hardware platform 605, such as an x86 architecture platform. Hardware platform 605 may include processor 502, memory 504, network communication interface 512, user interface device 510, and other input/output (I/O) devices, such as a presentation device. A virtualization software layer, also referred to hereinafter as a hypervisor 610, is installed on top of hardware platform 605.

The virtualization software layer supports a virtual machine execution space 630 within which multiple virtual machines (VMs $635_1$-$635_N$) may be concurrently instantiated and executed. Hypervisor 610 includes a device driver layer 615, and maps physical resources of hardware platform 605 (e.g., processor 502, memory 504, network communication interface 512, and/or user interface device 510) to "virtual" resources of each of VMs $635_1$-$635_N$ such that each of VMs $635_1$-$635_N$ has its own virtual hardware platform (e.g., a corresponding one of virtual hardware platforms $640_1$-$640_N$), each virtual hardware platform having its own emulated hardware (such as a processor 645, a memory 650, a network communication interface 655, a user interface device 660 and other emulated I/O devices in VM $635_1$). Hypervisor 610 may manage (e.g., monitor, initiate, and/or terminate) execution of VMs $635_1$-$635_N$ according to policies associated with hypervisor 610, such as a policy specifying that VMs $635_1$-$635_N$ are to be automatically restarted upon unexpected termination and/or upon initialization of hypervisor 610. In addition, or alternatively, hypervisor 610 may manage execution VMs $635_1$-$635_N$ based on requests received from a device other than host computing device 500. For example, hypervisor 610 may receive an execution instruction specifying the initiation of execution of first VM $635_1$ from a management device via network communication interface 512 and execute the execution instruction to initiate execution of first VM $635_1$.

In some examples, memory 650 in first virtual hardware platform $640_1$ includes a virtual disk that is associated with or "mapped to" one or more virtual disk images stored on a disk (e.g., a hard disk or solid-state disk) of host computing device 500. The virtual disk image represents a file system (e.g., a hierarchy of directories and files) used by first VM $635_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 615 includes, for example, a communication interface driver 620 that interacts with network communication interface 512 to receive and transmit data from, for example, a local area network (LAN) connected to host computing device 500. Communication interface driver 620 also includes a virtual bridge 625 that simulates the broadcasting of data packets in a physical network received from one communication interface (e.g., network communication interface 512) to other communication interfaces (e.g., the virtual communication interfaces of VMs $635_1$-$635_N$). Each virtual communication interface for each VM $635_1$-$635_N$, such as network communication interface 655 for first VM $635_1$, may be assigned a unique virtual Media Access Control (MAC) address that enables virtual bridge 625 to simulate the forwarding of incoming data packets from network communication interface 512. In an example, network communication interface 512 is an Ethernet adapter that is configured in "promiscuous mode" such that all Ethernet packets that it receives (rather than just Ethernet packets addressed to its own physical MAC address) are passed to virtual bridge 625, which, in turn, is able to further forward the Ethernet packets to VMs $635_1$-$635_N$. This configuration enables an Ethernet packet that has a virtual MAC address as its destination address to properly reach the VM in host computing device 500 with a virtual communication interface that corresponds to such virtual MAC address.

Virtual hardware platform $640_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 665 in order to execute applications 670 for an instantiated VM, such as first VM $635_1$. Virtual hardware platforms $640_1$-$640_N$ may be considered to be part of virtual machine monitors (VMM) $675_1$-$675_N$ that implement virtual system support to coordinate operations between hypervisor 610 and corresponding VMs $635_1$-$635_N$. Those with ordinary skill in the art will recognize that the various terms, layers, and categorizations used to describe the virtualization components in FIG. 5 may be referred to differently without departing from their functionality or the spirit or scope of the disclosure. For example, virtual hardware platforms $640_1$-$640_N$ may also be considered to be separate from VMMs $675_1$-$675_N$, and VMMs $675_1$-$675_N$ may be considered to be separate from hypervisor 610. One example of hypervisor 610 that may be used in an example of the disclosure is included as a component in VMware's ESX brand software, which is commercially available from VMware, Inc.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein. Specifically, the instructions described in the flow charts, when executed, transform a general-purpose computer into a special-purpose computing device configured to implement parentless VM forking.

The embodiments illustrated and described herein as well as embodiments not specifically described herein but within the scope of aspects of the disclosure constitute exemplary means for implementing parentless VM forking. For example, the components illustrated in the figures, when performing the operations illustrated in the figures, constitute these exemplary means.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A computing system for forking a virtual machine (VM) comprising:
   one or more physical processors; and
   a computer readable memory having stored thereon program code for forking a VM which, upon execution by the one or more physical processors, causes the one or more physical processors to:
     receive instructions to fork a source VM;
     temporarily stun execution of the source VM;
     create a destination VM;
     create a snapshot of a virtual disk associated with the source VM;

generate a first delta disk associated with the source VM, and a second delta disk associated with the destination VM;

transfer a checkpoint state of the source VM to the destination VM;

restore the destination VM using the transferred checkpoint state, the restored destination VM using the second delta disk as a writable disk; and restore the source VM from the checkpoint state, the restored source VM using the first delta disk as a writable disk, both the restored destination VM and the restored source VM referencing the created snapshot as read-only data.

2. The computing system of claim 1, the computer readable memory having stored thereon program code for forking a VM which, upon execution by the one or more processors, further causes the one or more processors to customize the destination VM, wherein customizing the destination VM includes one or more of the following: assigning a Media Access Control (MAC) address, assigning an Internet Protocol (IP) address, or customizing a hostname.

3. The computing system of claim 1, the computer readable memory having stored thereon program code for forking a VM which, upon execution by the one or more processors, further causes the one or more processors to reconfigure the destination VM, wherein reconfiguring the destination VM includes one or more of the following: adding a virtual central processing unit (CPU), removing a virtual CPU, adding virtual memory, removing virtual memory, managing virtual memory, adding virtual devices, removing virtual devices, or editing virtual devices.

4. The computing system of claim 1, the computer readable memory having stored thereon program code for forking a VM which, upon execution by the one or more processors, further causes the one or more processors to:

create one or more additional destination VMs prior to restoring the source VM from the checkpoint state;

transfer the checkpoint state from the source VM to the one or more additional destination VMs;

generate additional delta disks for each snapshot-supported virtual disk associated with the source VM; and restore the one or more additional destination VMs using the transferred checkpoint state, the additional destination VMs using the additional delta disks as writable disks and referencing the created snapshot as read-only data.

5. The computing system of claim 1, wherein the virtual disk associated with the source VM is a child-most disk of a disk hierarchy including a plurality of virtual disks associated with the source VM prior to generating the first delta disk associated with the source VM.

6. The computing system of claim 1, wherein transferring a checkpoint state of the source VM to the destination VM comprises:

creating, by the source VM, the checkpoint state;

pushing, by the source VM, the checkpoint state to a checkpoint cache at a kernel level;

polling, by the destination VM, the checkpoint cache for the checkpoint state; and retrieving, by the destination VM, the checkpoint state from the checkpoint cache based on the polling of the checkpoint cache.

7. The computing system of claim 1, wherein the virtual disk and the first and second delta disks are indexed disks including index portions and data extent portions; and generating the first and second delta disks includes copying an index portion of the virtual disk to the first and second delta disks such that the index portions of the first and second delta disks reference a data extent portion of the index portion of the virtual disk.

8. A computerized method of forking a virtual machine (VM) comprising:

receiving instructions to fork a source VM;

temporarily stunning execution of the source VM;

creating a destination VM;

creating a snapshot of a virtual disk associated with the source VM;

generating a first delta disk associated with the source VM, and a second delta disk associated with the destination VM;

transferring a checkpoint state of the source VM to the destination VM;

restoring the destination VM using the transferred checkpoint state, the restored destination VM using the second delta disk as a writable disk; and restoring the source VM from the checkpoint state, the restored source VM using the first delta disk as a writable disk, both the restored destination VM and the restored source VM referencing the created snapshot as read-only data.

9. The computerized method of claim 8, further comprising customizing the destination VM, wherein customizing the destination VM includes one or more of the following: assigning a Media Access Control (MAC) address, assigning an Internet Protocol (IP) address, or customizing a hostname.

10. The computerized method of claim 8, further comprising reconfiguring the destination VM, wherein reconfiguring the destination VM includes one or more of the following: adding a virtual CPU, removing a virtual CPU, adding virtual memory, removing virtual memory, managing virtual memory, adding virtual devices, removing virtual devices, or editing virtual devices.

11. The computerized method of claim 8, further comprising:

creating one or more additional destination VMs prior to restoring the source VM from the checkpoint state;

transferring the checkpoint state from the source VM to the one or more additional destination VMs;

generating additional delta disks associated with the one or more additional destination VMs; and restoring the one or more additional destination VMs using the transferred checkpoint state, the additional destination VMs using the additional delta disks as writable disks and referencing the created snapshot as read-only data.

12. The computerized method of claim 8, wherein the virtual disk associated with the source VM is a child-most disk of a disk hierarchy including a plurality of virtual disks associated with the source VM prior to generating the first delta disk associated with the source VM.

13. The computerized method of claim 8, wherein transferring a checkpoint state of the source VM to the destination VM comprises:

creating, by the source VM, the checkpoint state;

pushing, by the source VM, the checkpoint state to a checkpoint cache at a kernel level;

polling, by the destination VM, the checkpoint cache for the checkpoint state; and retrieving, by the destination VM, the checkpoint state from the checkpoint cache based on the polling of the checkpoint cache.

14. The computerized method of claim 8, wherein the virtual disk and the first and second delta disks are indexed disks including index portions and data extent portions; and
generating the first and second delta disks includes copying an index portion of the virtual disk to the first and second delta disks such that the index portions of the first and second delta disks reference a data extent portion of the index portion of the virtual disk.

15. One or more non-transitory computer storage media having computer-executable instructions for forking a VM that, upon execution by a processor, causes the processor to:
receive instructions to fork a source VM;
temporarily stun execution of the source VM;
create a destination VM;
create a snapshot of a virtual disk associated with the source VM;
generate a first delta disk associated with the source VM, and a second delta disk associated with the destination VM;
transfer a checkpoint state of the source VM to the destination VM;
restore the destination VM using the transferred checkpoint state, the restored destination VM using the second delta disk as a writable disk; and
restore the source VM from the checkpoint state, the restored source VM using the first delta disk as a writable disk, both the restored destination VM and the restored source VM referencing the created snapshot as read-only data.

16. The one or more non-transitory computer storage media of claim 15, the computer-executable instructions for forking a VM, upon execution by a processor, further cause the processor to customize the destination VM, wherein customizing the destination VM includes one or more of the following: assigning a Media Access Control (MAC) address, assigning an Internet Protocol (IP) address, or customizing a hostname.

17. The one or more non-transitory computer storage media of claim 15, the computer-executable instructions for forking a VM, upon execution by a processor, further cause the processor to reconfigure the destination VM, wherein reconfiguring the destination VM includes one or more of the following: adding a virtual CPU, removing a virtual CPU, adding virtual memory, removing virtual memory, managing virtual memory, adding virtual devices, removing virtual devices, or editing virtual devices.

18. The one or more non-transitory computer storage media of claim 15, the computer-executable instructions for forking a VM, upon execution by a processor, further causing the processor to:
create one or more additional destination VMs prior to restoring the source VM from the checkpoint state;
transfer the checkpoint state from the source VM to the one or more additional destination VMs;
generate additional delta disks associated with the one or more additional destination VMs; and
restore the one or more additional destination VMs using the transferred checkpoint state, the additional destination VMs using the additional delta disks as writable disks and referencing the created snapshot as read-only data.

19. The one or more non-transitory computer storage media of claim 15, wherein the virtual disk associated with the source VM is a child-most disk of a disk hierarchy including a plurality of virtual disks associated with the source VM prior to generating the first delta disk associated with the source VM.

20. The one or more non-transitory computer storage media of claim 15, wherein transferring a checkpoint state of the source VM to the destination VM comprises:
creating, by the source VM, the checkpoint state;
pushing, by the source VM, the checkpoint state to a checkpoint cache at a kernel level;
polling, by the destination VM, the checkpoint cache for the checkpoint state; and
retrieving, by the destination VM, the checkpoint state from the checkpoint cache based on the polling of the checkpoint cache.

* * * * *